United States Patent
Hsiao et al.

(10) Patent No.: US 10,058,955 B2
(45) Date of Patent: Aug. 28, 2018

(54) SUBSTRATE PACKAGING STRUCTURE AND PACKAGING METHOD THEREOF

(71) Applicant: AU Optronics Corporation, Hsin-Chu (TW)

(72) Inventors: Chih-Hung Hsiao, Hsin-Chu (TW); Wei-Chih Chang, Hsin-Chu (TW); Chou-Chin Weng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 326 days.

(21) Appl. No.: 14/324,536

(22) Filed: Jul. 7, 2014

(65) Prior Publication Data
US 2015/0202715 A1  Jul. 23, 2015

(30) Foreign Application Priority Data

Jan. 17, 2014  (TW) .............................. 103101829 A

(51) Int. Cl.
| | |
|---|---|
| B23K 26/00 | (2014.01) |
| B23K 26/064 | (2014.01) |
| B23K 26/06 | (2014.01) |
| B23K 26/20 | (2014.01) |
| H01L 51/52 | (2006.01) |

(52) U.S. Cl.
CPC .......... *B23K 26/064* (2015.10); *B23K 26/009* (2013.01); *B23K 26/0661* (2013.01); *B23K 26/206* (2013.01); *H01L 51/524* (2013.01)

(58) Field of Classification Search
CPC .............. B23K 26/009; B23K 26/0639; B23K 26/064; B23K 26/0661; B23K 26/206; B23K 26/00; H01L 51/524

USPC ................... 219/121.64, 121.85; 445/24, 25; 427/259

See application file for complete search history.

(56) References Cited

U.S. PATENT DOCUMENTS

| | | | |
|---|---|---|---|
| 7,313,309 B2 * | 12/2007 | Numata ............ | G02F 1/133524 349/61 |
| 7,537,504 B2 | 5/2009 | Becken et al. | |
| 8,247,730 B2 * | 8/2012 | Liu ...................... | H01L 51/5246 219/121.6 |
| 2003/0052084 A1 | 3/2003 | Tabery et al. | |
| 2008/0213482 A1 * | 9/2008 | Logunov ................. | C03C 17/09 427/259 |
| 2009/0229745 A1 * | 9/2009 | Lee ..................... | B23K 26/0661 156/272.8 |
| 2009/0308105 A1 | 12/2009 | Pastel et al. | |
| 2011/0102363 A1 * | 5/2011 | Yang ........................ | G06F 3/044 345/174 |
| 2011/0165816 A1 * | 7/2011 | Lee ..................... | B23K 26/0626 445/25 |
| 2013/0208478 A1 * | 8/2013 | Bowden .................... | F21V 7/06 362/260 |

FOREIGN PATENT DOCUMENTS

| | | |
|---|---|---|
| TW | 559887 | 11/2003 |
| TW | 201018301 | 5/2010 |

\* cited by examiner

*Primary Examiner* — Michael G Hoang
(74) *Attorney, Agent, or Firm* — WPAT, PC

(57) ABSTRACT

A substrate packaging structure includes an upper substrate, a lower substrate, a frit disposed there between for adhering the upper substrate and the lower substrate, and a light-diffusing component. The light-diffusing component is disposed on the upper substrate and corresponding to the frit. The light-diffusing component is utilized for diffusing a laser beam.

12 Claims, 9 Drawing Sheets

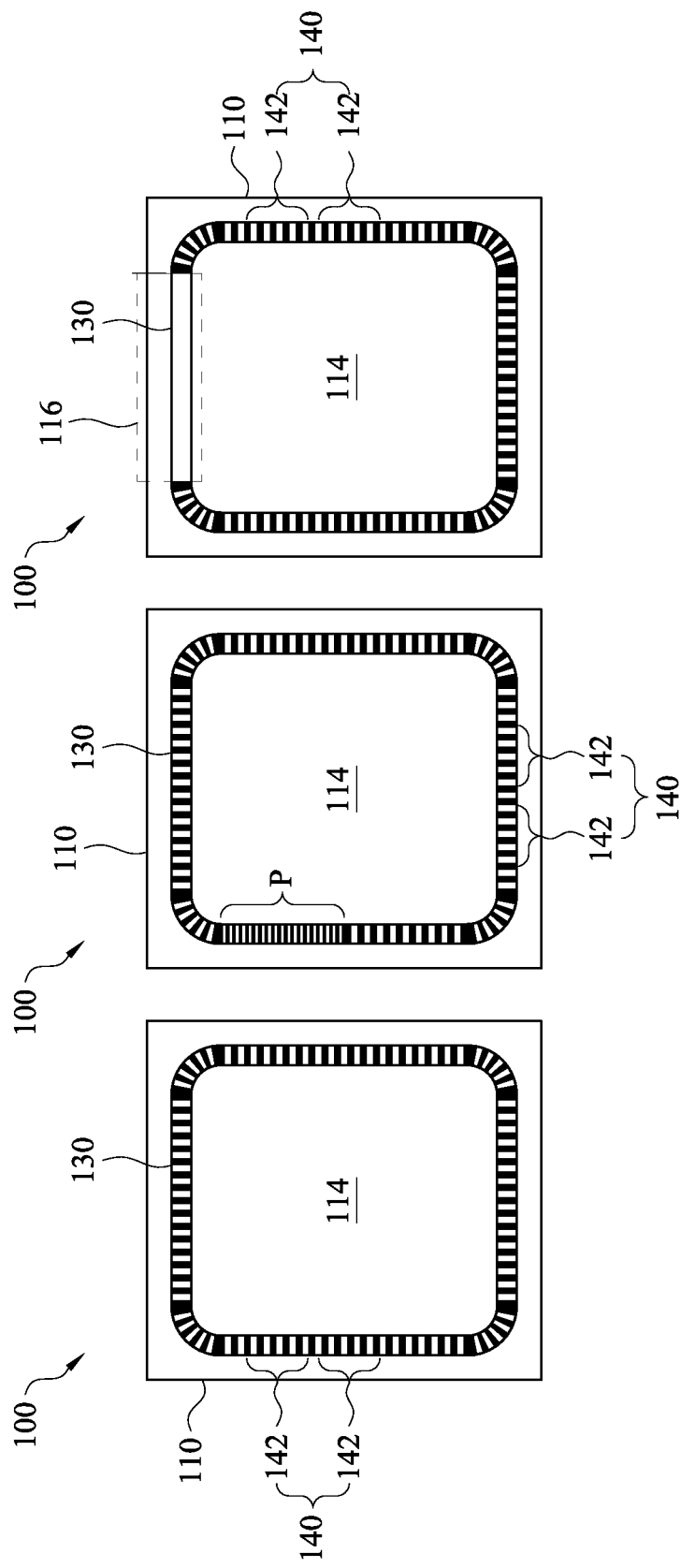

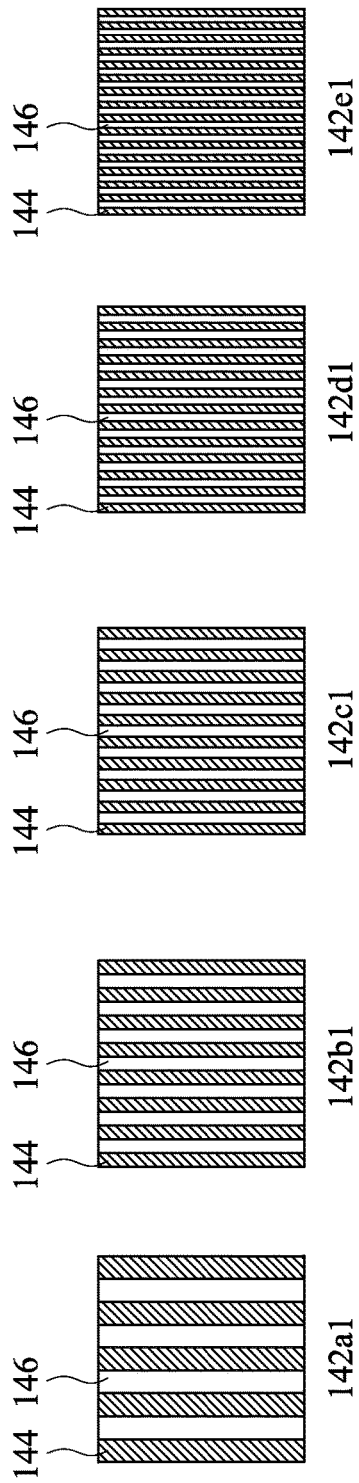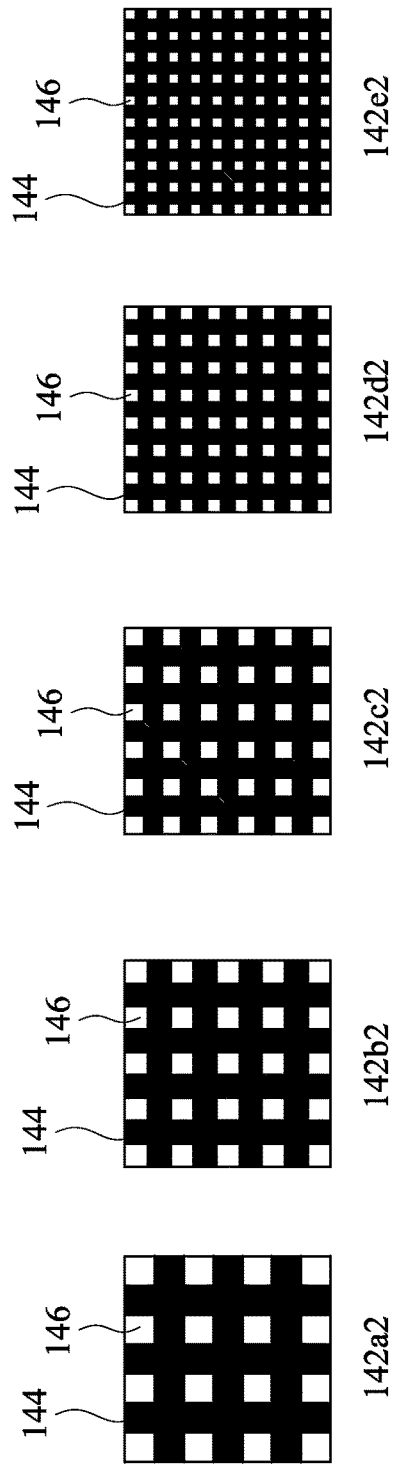
Fig. 3A
Fig. 3B

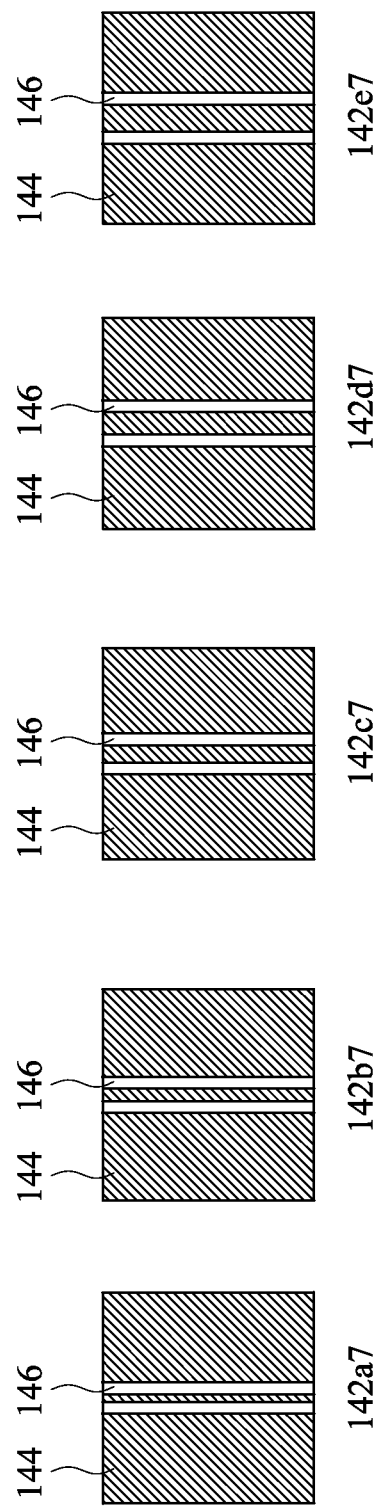

SUBSTRATE PACKAGING STRUCTURE AND PACKAGING METHOD THEREOF

RELATED APPLICATIONS

This application claims priority to Taiwan Application Serial Number 103101829, filed Jan. 17, 2014, which is herein incorporated by reference.

BACKGROUND

Field of Invention

The present invention relates to a substrate packaging structure.

Description of Related Art

Nowadays, the technology of the touch display is developed vigorously. Generally, the touch display panel module is composed of a touch panel and a display module. Generally, during the process of the package, in order to improve the seal between two glass substrates, the frit is utilized as the medium to adhere the glass substrates. Then, the laser beam heats and sinters the frit to adhere two glass substrates so that two glass substrates are sealed to avoid the effect of the moisture and oxygen from the environment.

In order to improve the efficiency of the package process, the time of the laser heating is short, so the heating temperature should be high enough to provide sufficient heat. However, during sintering the frit, owing to the thermal shock (rapid heating and cooling), the thermal defects, for example, voids or cracks are produced in the frit. Thus, the quality of the seal is affected so that the quality of the package is reduced.

For the forgoing reasons, there is a need for decreasing the thermal defect of the frit without scarifying the efficiency of the package.

SUMMARY

This invention provides a substrate packaging structure with a light-diffusing component, in order to decrease the thermal defect of the frit.

One aspect of this invention is providing a substrate packaging structure. The substrate packaging structure includes an upper substrate, a lower substrate, a frit which is disposed therebetween to adhere the upper substrate and the lower substrate, and a light-diffusing component. The light-diffusing component is disposed on the surface of the upper substrate which is opposite to the frit.

In one or more embodiments of this invention, the frit and the light-diffusing component are configured in a substantially frame shape.

In one or more embodiments of this invention, the light-diffusing component includes plural grating units. The patterns of the grating units are substantially the same.

In one or more embodiments of this invention, the grating units may include more than two different patterns.

In one or more embodiments of this invention, the material of the grating units may be optical reflection material or optical absorption material.

In one or more embodiments of this invention, the material of the grating units includes more than two materials of different refractive indexes.

In one or more embodiments of this invention, the light-diffusing component includes plural microstructures with triangle cross-section. The microstructures are disposed on the top surface of the upper substrate and include plural inclined planes.

In one or more embodiments of this invention, the substrate packaging structure selectively further includes at least one light transmission layer which is disposed between the microstructure and the upper substrate.

In one or more embodiments of this invention, the upper substrate is a touch panel.

In one or more embodiments of this invention, the touch panel has a wiring area which may not overlap the light-diffusing component.

Another aspect of this invention is providing a packaging method for said substrate packaging structure. The packaging method includes the steps of: providing an upper substrate and a lower substrate and the top surface of the upper substrate having a light-diffusing component; disposing a frit between the upper substrate and the lower substrate; and providing a laser beam to irradiate the substrate packaging structure. The frit is irradiated by the laser beam through the light-diffusing component so that the irradiating area is increased.

In one or more embodiments of this invention, the packaging method further includes moving the laser beam along the light-diffusing component or the frit. Therefore, the front part of the laser beam is utilized to pre-heat the frit, the central part of the laser beam is utilized to melt the frit and the back part of the laser beam is utilized to prevent the frit from fast cooling.

In the packaging method, because of the light-diffusing component disposed on the upper substrate, the laser beam is diffused by the light-diffusing component so that the irradiation angle thereof is increased. Thus, the irradiation area of the laser beam and the heating time of the frit are increased. The front part of the laser beam pre-heats the frit, the central part of the laser beam melts the frit and the back part of the laser beam prevents the frit from cooled too fast. Because the heating and cooling speed of the frit is slowed down during the packaging process, the thermal defects such as voids and cracks may be avoided effectively. Because the light-diffusing component is disposed on the upper substrate, the related equipment of the laser beam needs not be amended or modified so that the cost is saved.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 2A to 2C are top views of the substrate packaging structure according to different embodiments of this invention;

FIGS. 3A to 3G show patterns of a grating unit in the substrate packaging structure according to this invention;

DESCRIPTION OF THE EMBODIMENTS

Figure 1:
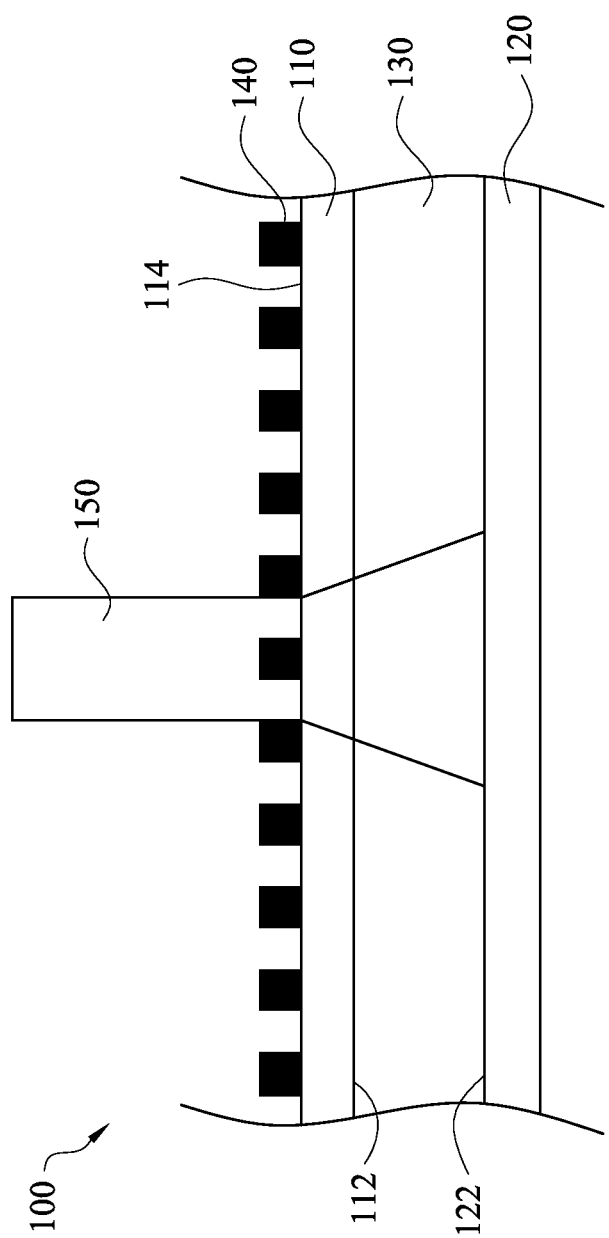
FIG. 1 is a schematic cross-sectional view of the substrate packaging structure according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 is a schematic cross-section view of the substrate packaging structure according to one embodiment of this invention. The substrate packaging structure 100 includes an upper substrate 110, a lower substrate 120, a frit 130, and a light-diffusing component 140. The frit 130 is disposed between the upper substrate 110 and the lower substrate 120. The light-diffusing component 140 is disposed on the upper substrate 110.

The frit 130 is disposed between the upper substrate 110 and the lower substrate 120. Further, the frit 130 is distributed between the upper substrate 110 and the lower substrate 120 and substantially in a frame shape. The frit 130 is a thermoplastic colloid, and is solid and non/low adhesiveness at room temperature. After the frit 130 is heated to a certain temperature, the solid colloid is melted and becomes liquid. Accordingly, the adhesiveness of the colloid increased, but the colloid becomes solid after cooled.

During the package process, the frit 130 is coated at a predetermined position on the upper substrate 110. The frit 130 is preferred to be in rectangular shape corresponding to the upper substrate 110. Then, the upper substrate 110 is aligned to the lower substrate 120 and stacked thereon. The laser beam 150 is aligned to the frit 130 and irradiates thereon, in order to heat and melt the frit 130. The frit 130 contacts the bottom surface 112 of the substrate 110 and the top surface 122 of the lower substrate 120. After heating, the adhesiveness of the frit 130 is enhanced so as to seal the upper substrate 110 and the lower substrate 120.

As mentioned above, in order to avoid the thermal defects of the frit 130 owing to the high temperature of the laser beam 150 or high temperature gradient of fast heating and cooling, the light-diffusing component 140 is disposed on the upper substrate 110 of the substrate packaging structure 100 in this invention. The light-diffusing component 140 is utilized to diffuse the laser beam 150 which is highly directional and energy concentrated into a fan-shaped beam. Accordingly, the irradiation area of the laser beam 150 on the frit 130 is increased so that the heating time of the frit 130 is increased.

Referring to FIGS. 2A to 2C, FIGS. 2A to 2C are top views of the substrate packaging structure 100 according to different embodiments of this invention. The light-diffusing component 140 is disposed on the top surface 114 of the upper substrate 110. The light-diffusing component 140 is disposed opposite to the frit 130. The light-diffusing component 140 and the frit 130 are substantially arranged in a rectangular shape. The light-diffusing component 140 includes plural grating units 142. The grating units 142 may be arranged with interval regularly so that the light may have a greater diffusion angle after it passes through the grating unit 142.

The material of the grating unit 142 may be an optical reflection material, for example, metal. In practice, the grating unit 142 may be aluminum, silver, magnesium, molybdenum, nickel or titanium. Otherwise, the material of the grating unit 142 may be an optical absorption material, for example, organic polymer or special metal. By the photolithography process, the optical reflection material or the optical absorption material is formed on the top surface of the upper substrate 110. The optical reflection material or the optical absorption material is formed as parallel fine lines and arranged tightly so that the slits are formed therebetween. When the light passes through the slits, the light diffuses to two opposite sides because of diffraction. The narrower the width of the slit is, the greater the diffusion angle of the light is.

Otherwise, the grating units 142 may include more than two materials of different refractive indexes, for example, silicon oxide, silicon nitride, organic material (e.g. photo resist) and so on. The transparent, low-transparent or opaque material is arranged on the upper substrate 110 parallelly and the refractive index thereof is different from that of the upper substrate 110. Similarly, the lines with different refractive indexes are formed alternatively. When the light passes through the line with greater refractive index, the phenomenon of diffraction occurs so that the light diffuses to two opposite sides.

As shown in FIG. 2A, the space between every two adjacent grating units 142 may be regular. As shown in FIG. 2B, the grating units 142 may be arranged irregularly. The density of the grating units 142 may increase at the start section and the end section P for the irradiation of the laser beam. As shown in FIG. 2C, the grating units 142 may only cover portion of the frit 130 as required. For example, when the upper substrate 110 is a touch substrate, a wiring area 116 (not shown) with wires which are tightly arranged is disposed on the upper substrate 110. Then, the grating unit 142 is preferred not to overlap the wiring area 116. The grating units 142 and the wiring area 116 may be formed by a photo mask. The wiring area 116 may provide similar effect as the grating units 142.

The patterns of the grating units 142 may be the same or include plural different patterns. As shown in FIGS. 3A to 3G, the patterns of the grating units 142 may include serious types. In FIGS. 3A to 3G, the black lines represent low transparent regions/opaque regions 144, while the white lines represent transparent regions 146.

In FIG. 3A, in low transparent regions/opaque regions 144 and transparent regions 146 of the grating units 142a1—142e1, there are straight lines arranged alternatively and parallelly each other. In one specific example, the widths of the lines in the low transparent regions/opaque regions 144 are the same. In one specific example, the widths of the lines in transparent regions 146 are the same, too. The summation of the line widths in the low transparent regions/opaque regions 144 and that of the line widths in transparent regions 146 may maintain a fixed ratio, for example, 1:1 or 7:3.

In FIG. 3B, in low transparent regions/opaque regions 144 of the grating units 142a2~142e2, there are vertical lines in parallel and horizontal lines in parallel so that the grid pattern is formed. The transparent regions 146 are arranged in matrix and related to the grid of said low transparent regions/opaque regions 144. In one specific example, the widths of the lines in the low transparent regions/opaque regions 144 are the same. In one specific example, the side lengths of transparent regions 146 are the same, too. The widths of the lines in the low transparent regions/opaque regions 144 are equal to the side lengths of transparent regions 146.

Figure 3C:
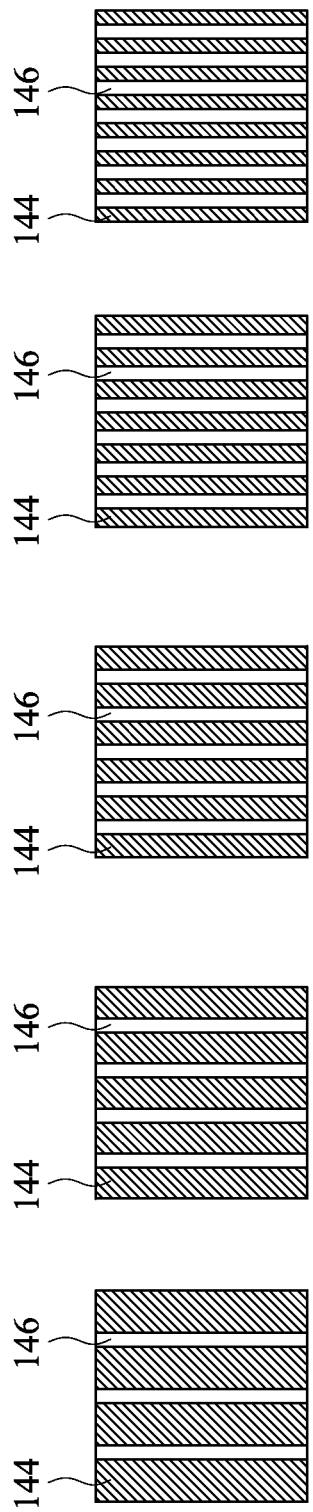

In FIG. 3C, in low transparent regions/opaque regions 144 and transparent regions 146 of the grating units 142a3~142e3, there are straight lines arranged alternatively and parallelly each other. In one specific example, the widths of the lines in the low transparent regions/opaque regions 144 are the same. In one specific example, the widths of the lines in transparent regions 146 are the same, too. The difference from FIG. 3A is that the widths of the lines in the low transparent regions/opaque regions 144 are greater than those of the lines in transparent regions 146. In some embodiment, there are different width ratios between the widths of the lines in the low transparent regions/opaque regions 144 and those of the lines in transparent regions 146.

Figure 3D:
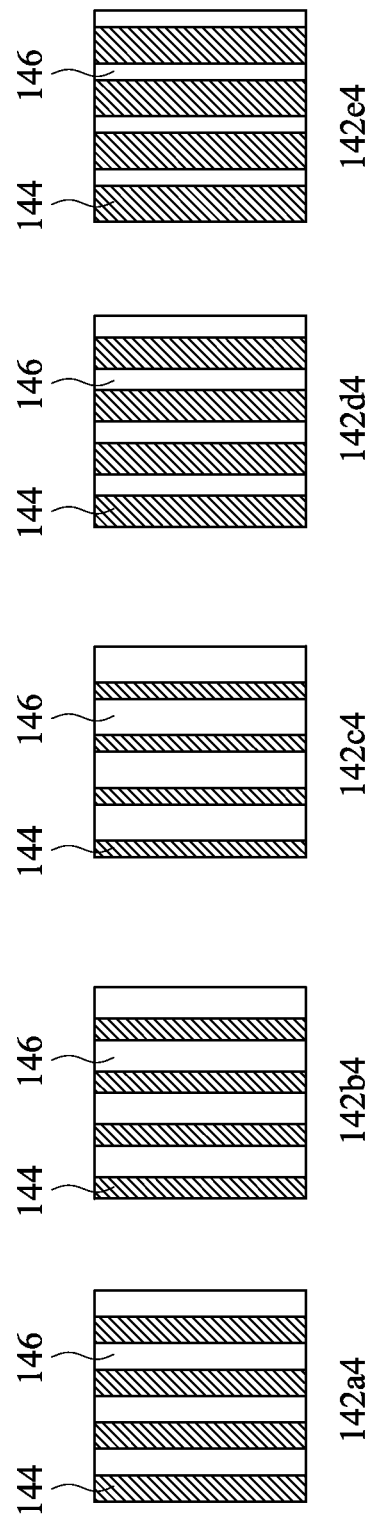

In FIG. 3D, in low transparent regions/opaque regions 144 and transparent regions 146 of the grating units 142a4~142e4, there are straight lines arranged alternatively and parallelly each other. In one specific example, the widths of the lines in the low transparent regions/opaque regions 144 are the same. In one specific example, the widths of the lines in transparent regions 146 are the same, too. In different embodiments, the widths of the lines in the low transparent regions/opaque regions 144 may be equal to or different from those of the lines in transparent regions 146. However, in some embodiment, the summation of the width of one line in the low transparent regions/opaque regions 144 and that of one line in transparent regions 146 (the pitch of the grating unit) keeps the same. In other words, for every grating patterns in FIG. 3D, the area ratio between the low transparent regions/opaque regions 144 and the transparent regions 146 is fixed.

Figure 3E:
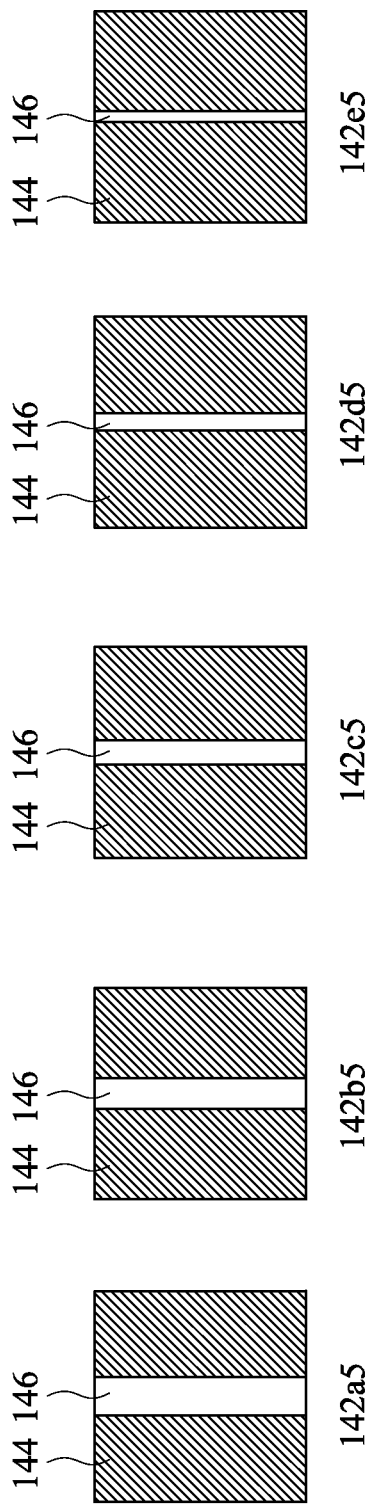

In FIG. 3E, the grating units 142a5~142e5 are the grating pattern with a single slit. The width of the line in transparent region 146 (i.e. the width of slit) may be modified as required.

Figure 3F:
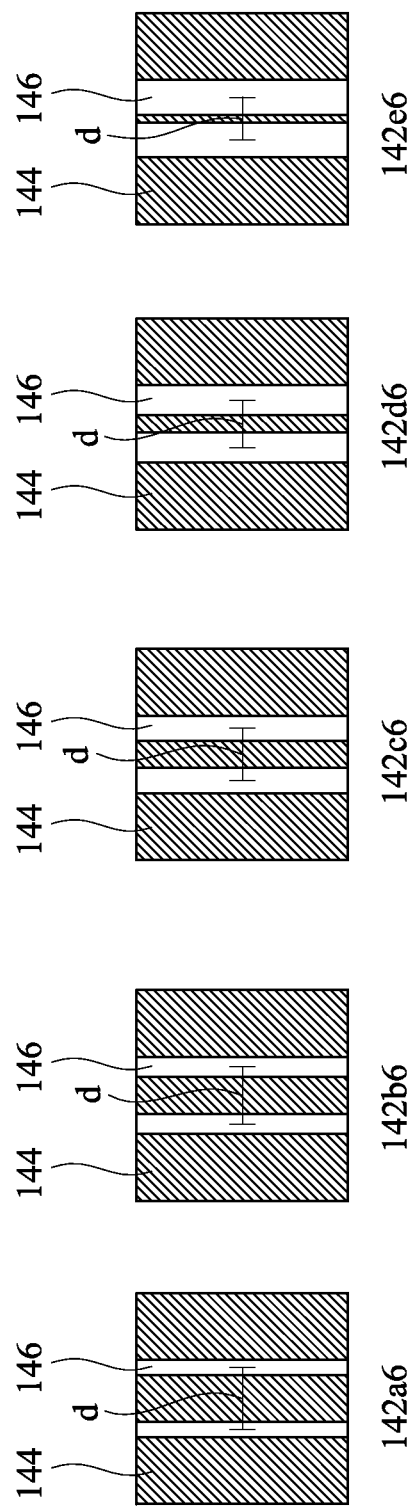

In FIG. 3F, the grating units 142a6~142e6 are the grating pattern with double slits. The widths of the lines in transparent region 146 (i.e. the width of slit) may be modified as required. The distance d between the centers of the two slits is fixed.

In FIG. 3G, the grating units 142a7~142e7 are the grating pattern with double slits. In some embodiment, the widths of the lines in transparent region 146 (i.e. the width of slit) are fixed. The distance between two slits may be modified as required.

According to different patterns of the grating units 142, the pitch of the grating units 142, that is, the summation of the width of one line in the low transparent regions/opaque regions 144 and that of one line in transparent regions 146 may vary. The pitch of the grating units 142 may be from 1 micron to 400 micron. Generally, the pitches of the grating in FIGS. 3E to 3G are greater than those in FIGS. 3A to 3D.

The patterns of the grating units 142 illustrated in FIGS. 3A to 3G are merely examples for explain and not to limit the scope of this invention. The person skilled in the art may modify the pattern of the grating unit 142 as required. For example, he may select one, plural or all patterns of the grating units from FIGS. 3A to 3G, and arrange them regularly or irregularly, in order to form the light-diffusing component 140 as shown in FIGS. 2A to 2C.

Taking the grating pattern with single slit for example, the finer the width of the slit is, the more obvious the phenomenon of fraction is, and the greater the diffusing angle is. For instance, the laser beam has the initial wavelength of 810 nanometer and the line width of 1 millimeter. After it passes through a slit with width of 1 micron, the width of the beam projected on the frit is 2.05 millimeter. After it passes through a slit with width of 2 micron, the width of the beam projected on the frit is 1.43 millimeter. After it passes through a slit with width of 5 micron, the width of the beam projected on the frit is 1.16 millimeter. After it passes through a slit with width of 10 micron, the width of the beam projected on the frit is 1.08 millimeter.

Certainly, the greater the diffusing angle of the light is, the wider the diffusing width is. Accordingly, the energy of the laser beam per unit area is decreased, that is the energy density of the laser beam is declined. Thus, the output power of the laser beam may be enhanced to compensate the energy density.

In addition to selecting different material and forming the grating pattern on the upper substrate, the light-diffusing component may be formed by disposing microstructures on the upper substrate regularly.

Figure 4:
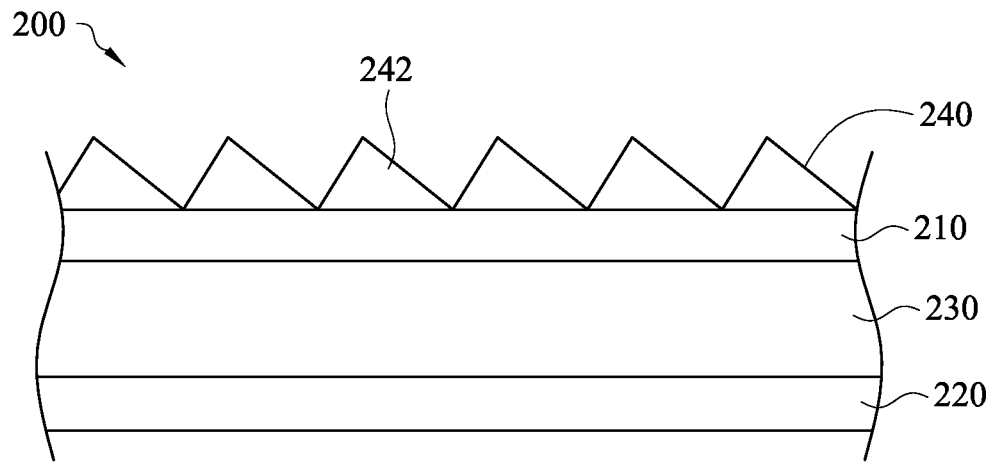
FIGS. 4 to 5 are schematic cross-section views of the substrate packaging structure according to different embodiments of this invention.

Referring to FIG. 4, FIG. 4 is a schematic cross-sectional view of the substrate packaging structure according to another embodiment of this invention. The substrate packaging structure 200 includes an upper substrate 210, a lower substrate 220, a frit 230, and a light-diffusing component 240. The frit 230 is disposed between the upper substrate 210 and the lower substrate 220. The light-diffusing component 240 is disposed on the upper substrate 210. In this embodiment, the light-diffusing component 240 is composed of regular microstructures.

For example, the light-diffusing component 240 includes plural microstructures 242 with triangle cross-section. The triangle pyramid microstructures 242 are disposed on the upper surface of the upper substrate 210. The triangle pyramid microstructures 242 include plural inclined planes. When the laser beam irradiates on the inclined planes of the microstructures 242, the phenomenon of refraction occurs because the refraction index of the triangle pyramid microstructures 242 is different from that of air. Accordingly, the laser beam is diffused.

The triangle pyramid microstructures 242 may be formed on the upper substrate 210. The material of the triangle pyramid microstructures 242 is transparent preferably. The material of the triangle pyramid microstructures 242 may be a transparent dielectric material, for example, silicon oxide, silicon nitric oxide, and silicon nitride. The material of the triangle pyramid microstructures 242 may be a transparent organic material such as a photo resist.

Figure 5:
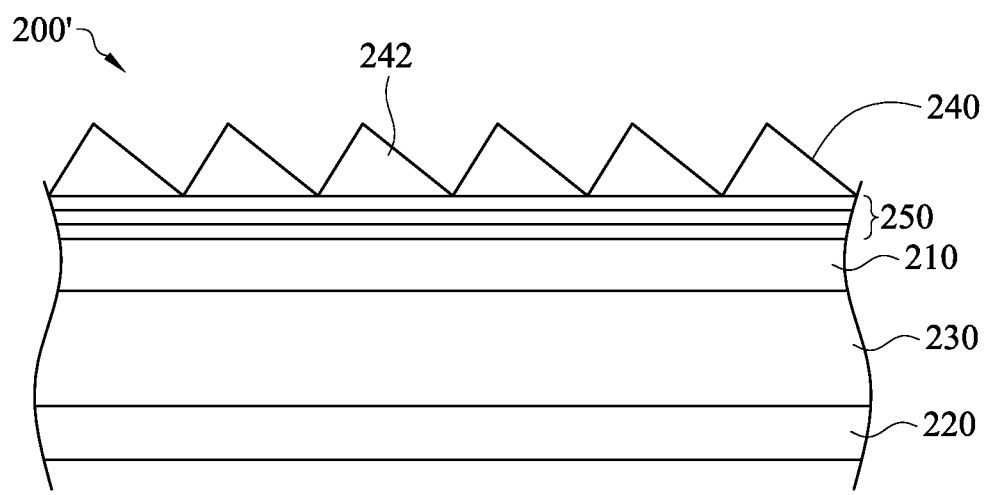

Referring to FIG. 5, FIG. 5 is a schematic cross-sectional view of the substrate packaging structure according to another embodiment of this invention. The substrate packaging structure 200' includes an upper substrate 210, a lower substrate 220, a frit 230, a light-diffusing component 240 and a light transmission layer 250. The frit 230 is disposed between the upper substrate 210 and the lower substrate 220. The light transmission layer 250 is disposed between the light-diffusing component 240 and the upper substrate 210.

In practice, the light-diffusing component 240 may not contact the upper substrate 210 directly. After at least one light transmission layer 250 is formed on the upper substrate 210, the light-diffusing component 240 is formed on the light transmission layer 250. The light-diffusing component 240 may include plural triangle pyramid microstructures 242 with an inclined plane. The light transmission layer 250 is disposed between the triangle pyramid microstructures 242 and the upper substrate 210. The light transmission layer 250 enhances the adhesion between the light-diffusing component 240 and the upper substrate 210 or provides necessary other function for the touch panel, for example, ITO trace, the protection layer and so on. The light transmission layer 250 may be a transparent dielectric material such as ITO, silicon oxide, silicon nitric oxide, silicon nitride, or a transparent organic material such as a photo resist.

In addition to transparent dielectric material such as silicon oxide, silicon nitric oxide, silicon nitride, or a transparent organic material such as a photo resist, the material of the triangle pyramid microstructures 242 may be a transparent light guiding material, for example, Polydimethl Siloxan (PDMS), Polydimethl Siloxan (PDMS) and so on.

The light-diffusing component 240 diffuses the laser beam by the triangle pyramid microstructures 242 with inclined planes. Accordingly, the irradiation time between the laser beam and the frit 230 is increased so that the thermal defects of the frit 230 by fast heating and cooling are decreased.

Figure 6:
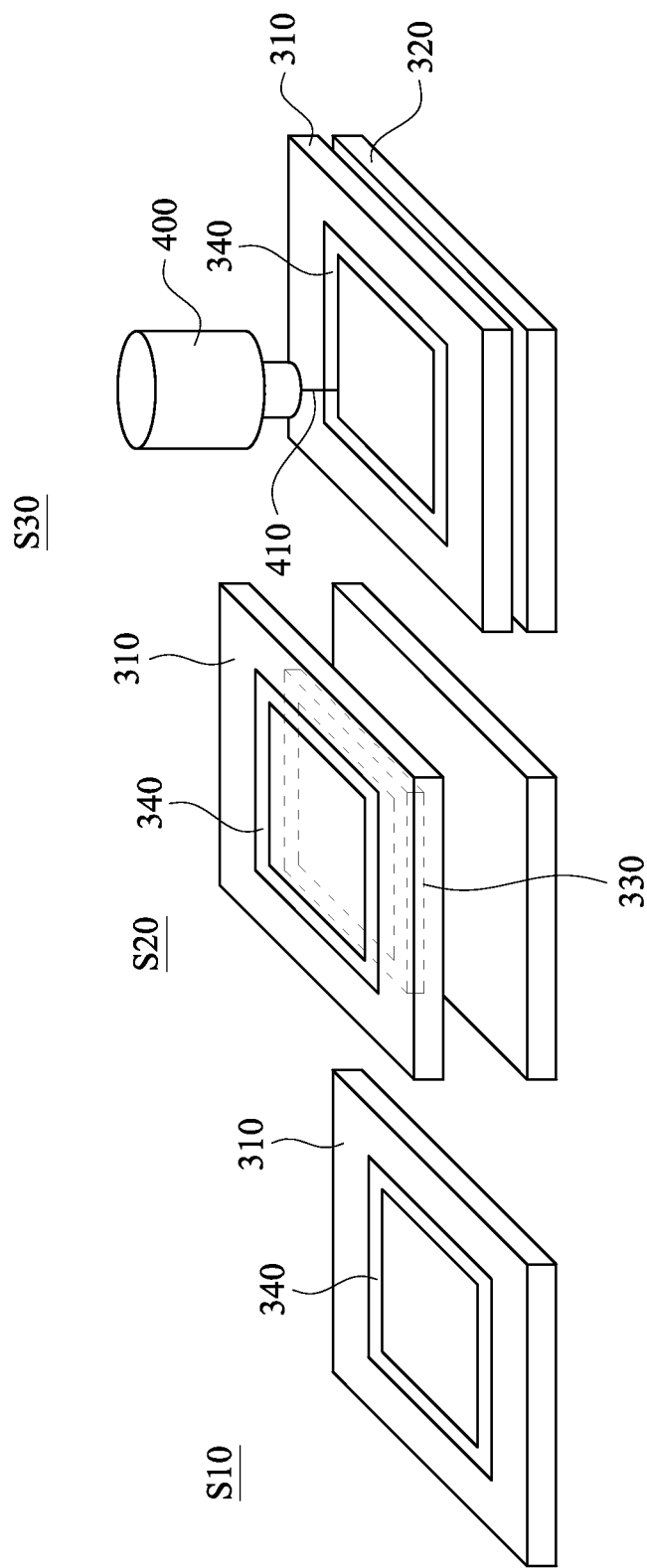
FIG. 6 is a flow chart of a substrate packaging method according to one embodiment of this invention.

Referring to FIG. 6, FIG. 6 is a flow chart of a substrate packaging method according to one embodiment of this invention. In step S10, the light-diffusing component 340 is formed on the top surface of the upper substrate 310. The light-diffusing component 340 may be grating units or regular microstructures.

Then, in step S20, the frit 330 is coated on the bottom surface of the upper substrate 310 and aligned to the light-diffusing component 340. The upper substrate 310 is aligned to and attached to the lower substrate 320.

In step S30, the laser beam source 400 provides the laser beam 410 to irradiate the substrate packaging structure. The laser beam 410 irradiates the frit through the light-diffusing component 340. Because the laser beam 410 passes through the light-diffusing component 340, it is diffused and has a greater irradiation angle.

Figure 7:
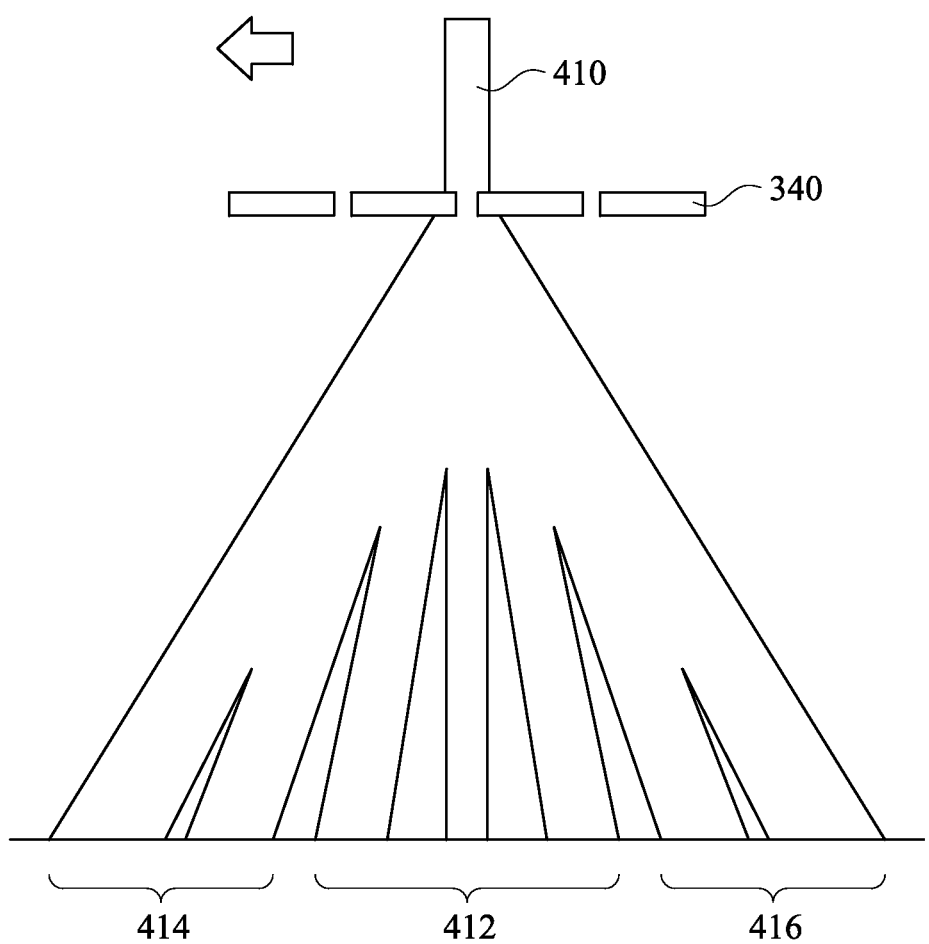
FIG. 7 is a schematic view showing the laser beam in FIG. 6 passing through the light-diffusing component.

Referring to FIG. 7, FIG. 7 is a schematic view showing the laser beam 410 in FIG. 6 passing through the light-diffusing component 340. As shown in FIG. 7, the light-diffusing component 340 is made of grating units. After the laser beam passes through the light-diffusing component 340, the laser beam is diffused into a light combination of multi-stages because of the phenomenon of diffraction. Accordingly, the irradiation area between the laser beam 410 and the frit is increased, the heating time of the frit is increased and the thermal defects such as voids or cracks of the frit 230 by fast heating and cooling are decreased.

In practice, during the heating, the laser beam 410 is moved relative to the frit. In other words, the laser beam 410 is moved along the direction of the frit. The laser beam 410 may be divided into the central part 412, the front part 414 and the back part 416.

The energy density of the laser beam 410 in the central part 412 is higher than those in the front part 414 or the back part 413. Although the energy of the laser beam 410 in the front part 414 and the back part 416 is too lower to melt the frit, the front part 414 of the laser beam 410 may pre-heat the frit during heating. Accordingly, the temperature of the frit may be risen to a certain temperature, and the central part 412 of the laser beam 410 melts the frit. The back part 416 of the laser beam 410 keeps the temperature of the frit to prevent it from fast cooling.

As shown in FIG. 6 and FIG. 7, because the light-diffusing component 340 is disposed on the upper substrate 310, after the laser beam 410 passes through the light-diffusing component 340, it is diffused and has greater irradiation angle. Therefore, the irradiation area between the laser beam 410 and the frit is increased, and the heating time of the frit is increased. the front part 414 of the laser beam 410 pre-heats the frit, the central part 412 of the laser beam 410 melts the frit and the back part 416 of the laser beam 410 prevents the frit from fast cooling. Comparing with the conventional high-temperature, high speed packaging process, the thermal defects such as voids or cracks owing to fast heating and cooling are decreased effectively. Because the light-diffusing component 340 is disposed on the upper substrate 310, the laser beam source needs no extra modification or amendment and the cost is saved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A substrate packaging structure, comprising:
    an upper substrate;
    a lower substrate;
    a frit, disposed between the upper substrate and the lower substrate to adhere the upper substrate and the lower substrate; and
    a light-diffusing component, formed on and in contact with a surface of the upper substrate, wherein the surface is opposite to the frit, and the light-diffusing component includes a plurality of grating units that are arranged in regular intervals so that a light has a greater diffusion angle after it passes through the plurality of grating units, resulting in an irradiation area of the light and a heating time of the frit being increased.

2. The substrate packaging structure of claim 1, wherein the frit and the light-diffusing component are configured in a frame shape.

3. The substrate packaging structure of claim 1, wherein patterns of the plurality of grating units are substantially the same.

4. The substrate packaging structure of claim 1, wherein the plurality of grating units comprise more than two different patterns.

5. The substrate packaging structure of claim 1, wherein the material of the plurality of grating units is an optical reflection material or an optical absorption material.

6. The substrate packaging structure of claim 1, wherein the material of the plurality of grating units comprises more than two materials of different refractive indexes.

7. The substrate packaging structure of claim 1, wherein the light-diffusing component comprises a plurality of microstructures with a triangle cross-section, wherein the light-diffusing component is disposed on a top surface of the upper substrate.

8. The substrate packaging structure of claim 7, further comprising at least one light transmission layer disposed between the light-diffusing component and the upper substrate.

9. The substrate packaging structure of claim 1, wherein the upper substrate is a touch panel.

10. The substrate packaging structure of claim 9, wherein the touch panel has a wiring area, and the wiring area and the light-diffusing component are not overlapped.

11. A method for packaging a substrate packaging structure, comprising:
    providing an upper substrate; providing a lower substrate; disposing a frit between the upper substrate and the lower substrate; providing a light-diffusing component formed on and in contact with a top surface of the upper substrate, and the light-diffusing component including a plurality of grating units that are arranged in regular intervals; and
    providing a laser beam to irradiate the substrate packaging structure, wherein the frit is irradiated by the laser beam through the plurality of grating units of the light-diffusing component so that the laser beam has a greater diffusion angle after it passes through the plurality of grating units, resulting in an irradiation area of the laser beam and a heating time of the frit being increased.

12. The packaging method of claim 11, further comprising:

moving the laser beam along a configuration direction of the light-diffusing component or the frit, wherein a front part of the laser beam is utilized to pre-heat the frit, a central part of the laser beam is utilized to melt the frit, and the back part of the laser beam is utilized to decrease thermal defects.

* * * * *